(12) United States Patent
Tahara et al.

(10) Patent No.: US 6,834,083 B1
(45) Date of Patent: Dec. 21, 2004

(54) DATA TRANSMITTING METHOD AND DATA TRANSMITTER

(75) Inventors: Katsumi Tahara, Kanagawa (JP); Yasuo Iwasaki, Kanagawa (JP); Tetsuya Iwamoto, Kanagawa (JP); James Hedley Wilkinson, Basingstoke (GB)

(73) Assignees: Sony Corporation, Tokyo (JP); Sony United Kingdom Limited, Basingstoke (GB)

( * ) Notice: Subject to any disclaimer, the term of this patent is extended or adjusted under 35 U.S.C. 154(b) by 0 days.

(21) Appl. No.: 09/719,792
(22) PCT Filed: Apr. 16, 1999
(86) PCT No.: PCT/JP99/02041
§ 371 (c)(1),
(2), (4) Date: Mar. 26, 2001
(87) PCT Pub. No.: WO00/64155
PCT Pub. Date: Oct. 26, 2000

(51) Int. Cl.[7] ................................................. H04N 7/12
(52) U.S. Cl. ............. 375/240.28; 375/240; 375/240.01; 375/240.12; 375/240.26
(58) Field of Search ............................ 375/240, 240.01, 375/240.12, 240.26, 240.28; 386/52, 53; 382/238; 348/425.2

(56) References Cited

U.S. PATENT DOCUMENTS

| 4,325,088 A | * | 4/1982 | Wright | 386/53 |
| 5,703,995 A | * | 12/1997 | Willbanks | 386/52 |
| 5,867,230 A | * | 2/1999 | Wang et al. | 348/425.2 |
| 6,275,618 B1 | * | 8/2001 | Kodama | 382/238 |

FOREIGN PATENT DOCUMENTS

JP 04-14974 1/1992

OTHER PUBLICATIONS

Kamiura, "Packet densou SDTI" Eizou Jouhou Media Gakkaishi, vol. 51 No. 11, pp. 1826 to 1834.

* cited by examiner

Primary Examiner—Chris Kelley
Assistant Examiner—Allen Wong
(74) Attorney, Agent, or Firm—Frommer Lawrence & Haug LLP; William S. Frommer

(57) ABSTRACT

This invention relates to a data transmission method or the like for use in transmitting video data, audio data or the like. There is transmitted a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area. Into the payload area, there are inserted first data containing extension data having stream information and second data containing main data comprising video data and/or audio data at the picture unit of video data. The stream information is information which indicates whether or not the picture unit belongs to a pre-roll interval located ahead of an editing interval, whether or not the picture unit belongs to an editing interval and whether or not the picture unit belongs to a post-roll interval located behind an editing interval. A reception side becomes able to positively edit data on a VTR, for example, by effectively utilizing the stream information.

8 Claims, 16 Drawing Sheets

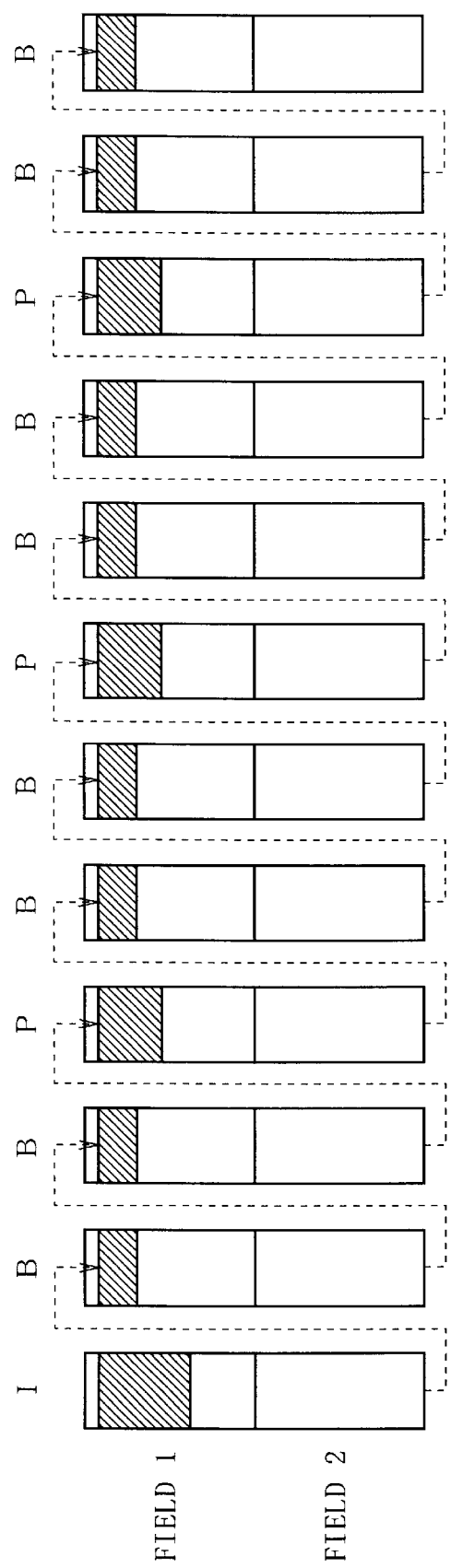

FIG. 8
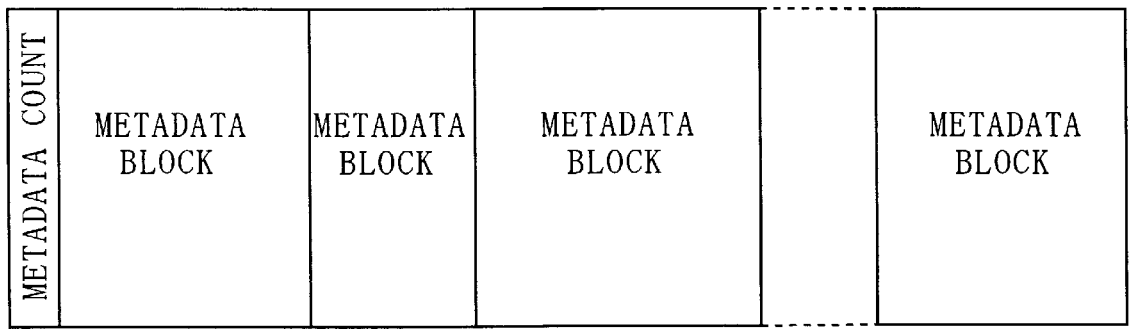
FIG. 9A
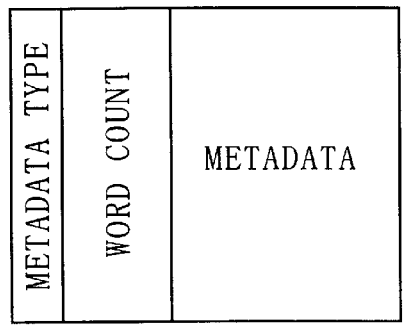
FIG. 9B
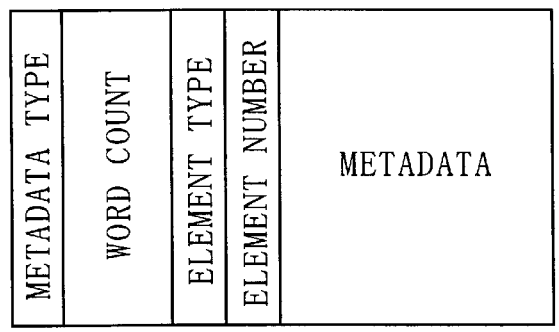
FIG. 9C
| b7 | b15 |
|----|-----|
| b6 | b14 |
| b5 | b13 |
| b4 | b12 |
| b3 | b11 |
| b2 | b10 |
| b1 | b9  |
| b0 | b8  |

FIG. 12
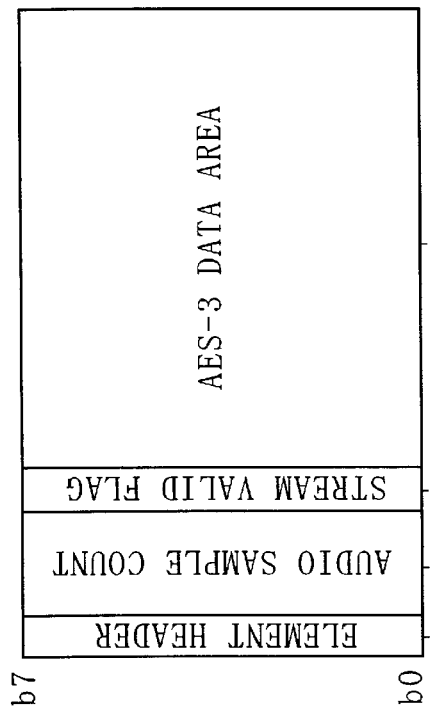
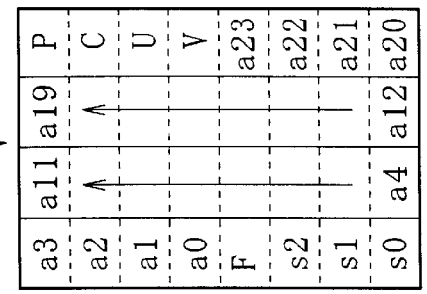
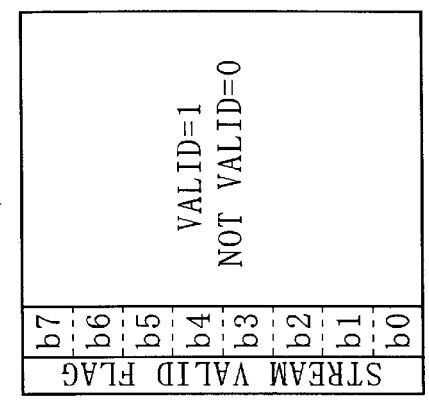
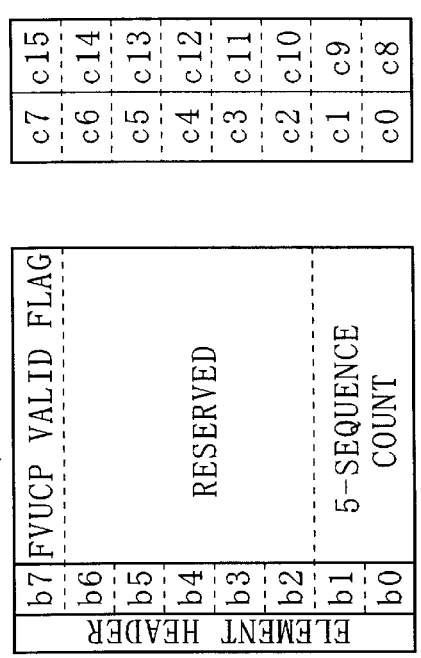

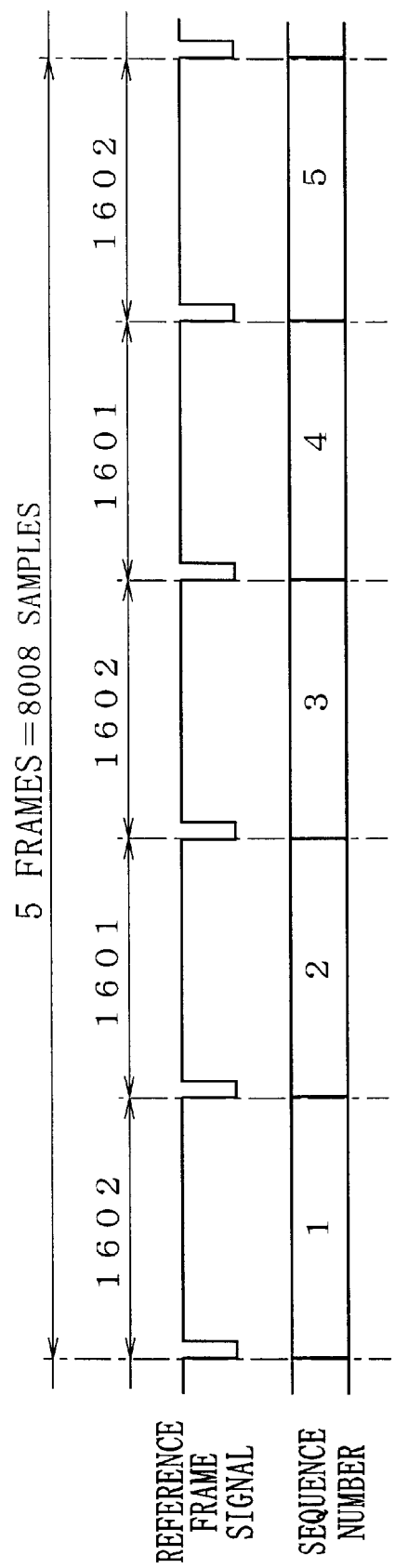

FIG. 14A

| PICTURE EDITING BITMAP | | |
|---|---|---|
| | b7 | EDIT FLAG |
| | b6 | — |
| | b5 | ERROR FLAG |
| | b4 | — |
| | b3 | PICTURE CODING VALID |
| | b2 | PROFILE/LEVEL VALID |
| | b1 | HV SIZE VALID |
| | b0 | USER BITMAP VALID |

FIG. 14B

| PICTURE CODING | | |
|---|---|---|
| | b7 | CLOSED GOP |
| | b6 | BROKEN LINK |
| | b5 | PICTURE CODING TYPE |
| | b4 | |
| | b3 | |
| | b2 | RESERVED |
| | b1 | |
| | b0 | |

FIG. 14C

| MPEG USER BITMAP | | |
|---|---|---|
| | b7 | HISTORY DATA |
| | b6 | ANC DATA |
| | b5 | VIDEO INDEX |
| | b4 | PICTURE ORDER |
| | b3 | TIMECODE 2 |
| | b2 | TIMECODE 1 |
| | b1 | H-PHASE |
| | b0 | V-PHASE |

FIG. 15A

| FIELD/FRAME FLAGS | | | | | | | |
|---|---|---|---|---|---|---|---|
| b7 | b6 | b5 | b4 | b3 | b2 | b1 | b0 |
| FRAME=0 FIELD=1 | | | | | | | |

FIG. 15B

| AUDIO EDITING BITMAP | | | | | | | |
|---|---|---|---|---|---|---|---|
| b7 | b6 | b5 | b4 | b3 | b2 | b1 | b0 |
| FIRST EDIT FLAG | SECOND EDIT FLAG | | ERROR FLAG | | RESERVED | | |

FIG. 15C

| CS VALID BITMAP | | | | | | | |
|---|---|---|---|---|---|---|---|
| b7 | b6 | b5 | b4 | b3 | b2 | b1 | b0 |
| CS VALID 4 | CS VALID 3 | CS VALID 2 | CS VALID 1 | RESERVED | | | |

FIG. 15D

| CHANNEL STATUS DATA |
|---|
| N BYTES (N=6, 18 or 22) |

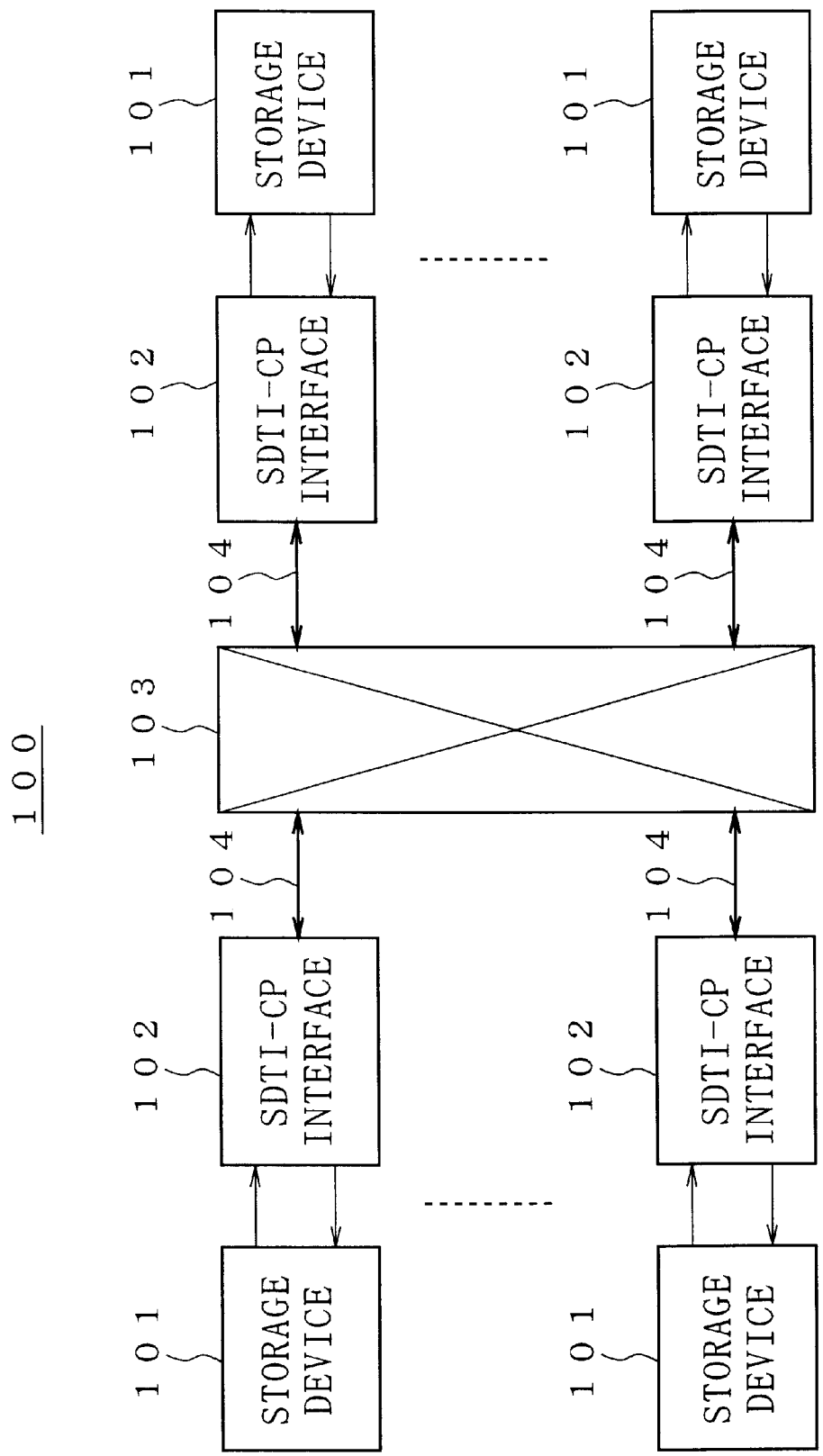

DATA TRANSMITTING METHOD AND DATA TRANSMITTER

TECHNICAL FIELD

This invention relates to a data transmission method and a data transmission apparatus for use in transmitting video data, audio data and metadata other than the video data and the audio data, or the like.

BACKGROUND ART

The SDI (Serial Digital Interface) format is standardized by SMPTE-259M of the SMPTE (Society of Motion Picture and Television Engineers) which issues standards concerning television engineering and video engineering. This SDI format is fundamentally a signal standard for the D-1 format or the D-2 format which may be a digital signal standard.

This SDI format is able to effect the transmission for only data of limited media. To be concrete, media that can be transmitted may be one channel of video data and about 8 channels of baseband audio data. For this reason, the SDI format is unsuitable for multimedia or multichannel.

Also, the SDTI (Serial Data Transport Interface) format is standardized by SMPTE-305M of the SMPTE. This SDTI format is suitable for multimedia or multichannel while the advantage of the SDI format is being effectively utilized and a common property with the SDI format is being kept in part. This SDTI format is the standard for transmitting the baseband signal and is able to transmit an end synchronizing code (EAV: End of Active Video) an a start synchronizing code (SAV: Start of Active Video) together.

That is, according to the SDTI format, there can be transmitted a serial digital transfer interface transmission packet in which an interval of each line of a video frame comprises an area into which an EAV is inserted, an ancillary data area into which ancillary data is inserted (ancillary data portion ANC), an area into which an SAV is inserted and a payload area into which video data and audio data are inserted.

It is considered that the transmission of the stream (SDTI stream) based on such SDTI format may be utilized in the VTR editing. In the VTR editing, the SDTI stream may be transmitted from a reproducing VTR side to a recording VTR side.

Since VTRs may use a servo motor as a tape driving system or the like and cannot be immediately operated at the editing point, for the purpose of synchronization of a servo or the like, they need a pre-roll (pre-roll) interval which may be a runup interval for a preparation of some degree before IN (In)-point of editing. Similarly, since VTRs cannot stop a tape driving system or the like immediately, they need a post-roll (post-roll) interval after OUT (Out)-point of editing.

Therefore, in the above-mentioned VTR editing, the stream transmitted from the reproducing VTR side to the recording VTR side should have stream information indicative of whether a picture unit belongs to the pre-roll interval located ahead of the editing interval, whether a picture unit belongs to the editing interval and whether a picture unit belongs to the post-roll interval located behind the editing interval.

An object of this invention is to make the VTR editing become possible in which a stream may be transmitted from a reproducing VTR side, for example, to a recording VTR side.

DISCLOSURE OF INVENTION

A data transmission method according to this invention is a data transmission method for transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which main data comprising video data and/or audio data is inserted. This data transmission method comprises a first step of inserting first data containing extension data having stream information indicating whether or not a picture unit belongs to a pre-roll interval located ahead of an editing interval, whether or not a picture unit belongs to an editing interval and whether or not a picture unit belongs to a post-roll interval located behind an editing interval and second data containing the main data into the payload area at the picture unit of the video data and a second step of transmitting the transmission packet in which the first data and the second data are inserted into the payload area in the form of serial data.

For example, the stream information indicating that the picture unit belongs to the editing interval further indicates whether or not the picture unit is the first picture unit of the editing interval, whether or not the intermediate picture unit of the editing interval, whether or not the picture unit is the last picture unit of the editing interval and whether or not the picture unit is the first and last picture units of the editing interval.

Also, a data transmission apparatus according to this invention is a data transmission apparatus for transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which main data comprising video data and/or audio data is inserted. This data transmission apparatus includes a means for inserting first data containing extension data having stream information indicating whether or not the picture unit belongs to a pre-roll interval located ahead of an editing interval, whether or not the picture unit belongs to the editing interval and whether or not the picture unit belongs to a post-roll interval located behind the editing interval and second data containing the main data into the payload area at the picture unit of video data and a means for transmitting the transmission packet in which the first data and the second data were inserted into the payload area in the form of serial data.

According to this invention, the first data containing the extension data having the stream information and the second data containing the main data comprising the video data and/or audio data are inserted into the payload area. Therefore, since the receiving side is able to control an operation of a tape driving system of a recording VTR, for example, a VTR editing becomes possible.

A data reception method according to this invention is a data reception method of receiving a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which first data containing main data comprising video data and/or audio data and second data containing extension data having stream information indicating whether or not a picture unit belongs to a pre-roll interval located ahead of an editing interval, whether or not a picture unit belongs to an editing interval and whether or not a picture unit belongs to a post-roll interval located behind an editing interval are inserted at the picture unit of video data. This data reception method comprises the steps of a first step of receiving a transmission packet, a second step of extracting main data and extension data from the received transmission packet and a third step of controlling recording of main data on the basis of stream information within the extracted extension data.

Also, a data reception apparatus according to this invention is a data reception apparatus for receiving a transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which first data containing main data comprising video data and/or audio data and second data containing extension data having stream information indicating whether or not a picture unit belongs to a pre-roll interval located ahead of an editing interval, whether or not a picture unit belongs to an editing interval and whether or not a picture unit belongs to a post-roll interval located behind an editing interval are inserted at the picture unit of video data. This data reception apparatus includes a means for receiving a transmission packet, a means for extracting main data and extension data from the received transmission packet and a means for controlling recording of main data on the basis of stream information within the extension data.

According to this invention, the extension data having the stream information and the main data comprising the video data and/or audio data are extracted from the received transmission packet at the picture unit of the video data, and the recording of the main data is controlled on the basis of the stream information. An operation of a tape driving system or the like of a VTR is started in the pre-roll interval, for example, a synchronization of a servo or the like is established, the main data is recorded during the editing interval, and the operation of the tape driving system or the like of the VTR is stopped during the following post-roll interval. Thus, a VTR becomes possible.

BRIEF DESCRIPTION OF DRAWINGS

FIG. 4 is a diagram showing the layout of a contents package using GOP of the MPEG-2.

FIG. 8 is a diagram showing an arrangement of a metadata set.

FIGS. 9A to 9C are diagrams showing an arrangement of "Item Metadata Block".

FIG. 12 is a diagram showing an arrangement of an 8-channel AES-3 element.

FIG. 13 is a diagram to which reference will be made in explaining a 5-frame sequence.

FIGS. 14A to 14C are diagrams to which reference will be made in explaining MPEG-2 image editing metadata.

FIGS. 15A to 15D are diagrams to which reference will be made in explaining audio editing metadata.

FIG. 16 is a block diagram showing an example of a transmission system of an SDTI-CP stream.

BEST MODE FOR CARRYING OUT THE INVENTION

An embodiment according to this invention will hereinafter be described with reference to the drawings. In this embodiment, respective contents items (e.g. picture item (Picture Item) and audio item (Audio Item)) may be generated by packaging data such as video and audio sources, and one contents item (system item (System Item)) may be generated by packaging information concerning each contents item and metadata concerning each contents or the like. These contents items may be used as contents packages. Further, a transmission package may be generated from this contents package, and may be transmitted by using a serial digital transfer interface.

This serial digital transfer interface is adapted to transmit the above-mentioned content package by effectively utilizing a digital signal serial transmission format of an SMPTE-259M "10-bit 4:2:2 Component and 4fsc Composite Digital Signals-Serial Digital Interface" (hereinafter referred to as "serial digital interface SDI (Serial Digital Interface) format") standardized by the SMPTE, for example, or the standard SMPTE-305M "Serial Data Transport Interface" (hereinafter referred to as "SDTI format") to transmit a digital signal which may be assembled into packets.

When the SDI format standardized by the SMPTE-259M is located in the video frame, an NTSC525 system digital video signal may comprise 1716 (4+268+4+1440) words per line in the horizontal direction and 525 lines in the vertical direction. Also, a PAL625 system digital video signal may comprise 1728 (4+280+4+1440) words per line in the horizontal direction and 625 lines in the vertical direction where 10 bits/word may be established.

With respect to each line, 4 words ranging from the first word to the fourth word may indicate the end of a 1440-word active video area which may be a video signal area, and may be used as an area to store a code EAV (End of Active Video) which may be used to separate the active video area and an ancillary data area, which will be described later on.

Also, with respect to each line, 268 words ranging from the fifth word to 272th word may be used as the ancillary data area to store header information or the like. 4 words ranging from 273th word to 276th word may indicate the start of the active video area, and may be used as an area to store a code SAV (Start of Active Video) which may be used to separate the active video area and the ancillary data area. Words following 277th word may be used as the active video area.

According to the SDTI format, the above-mentioned active video area may be used as a payload area and the codes EAV and SAV may be used to indicate the end and the start of the payload area.

Figure 1:
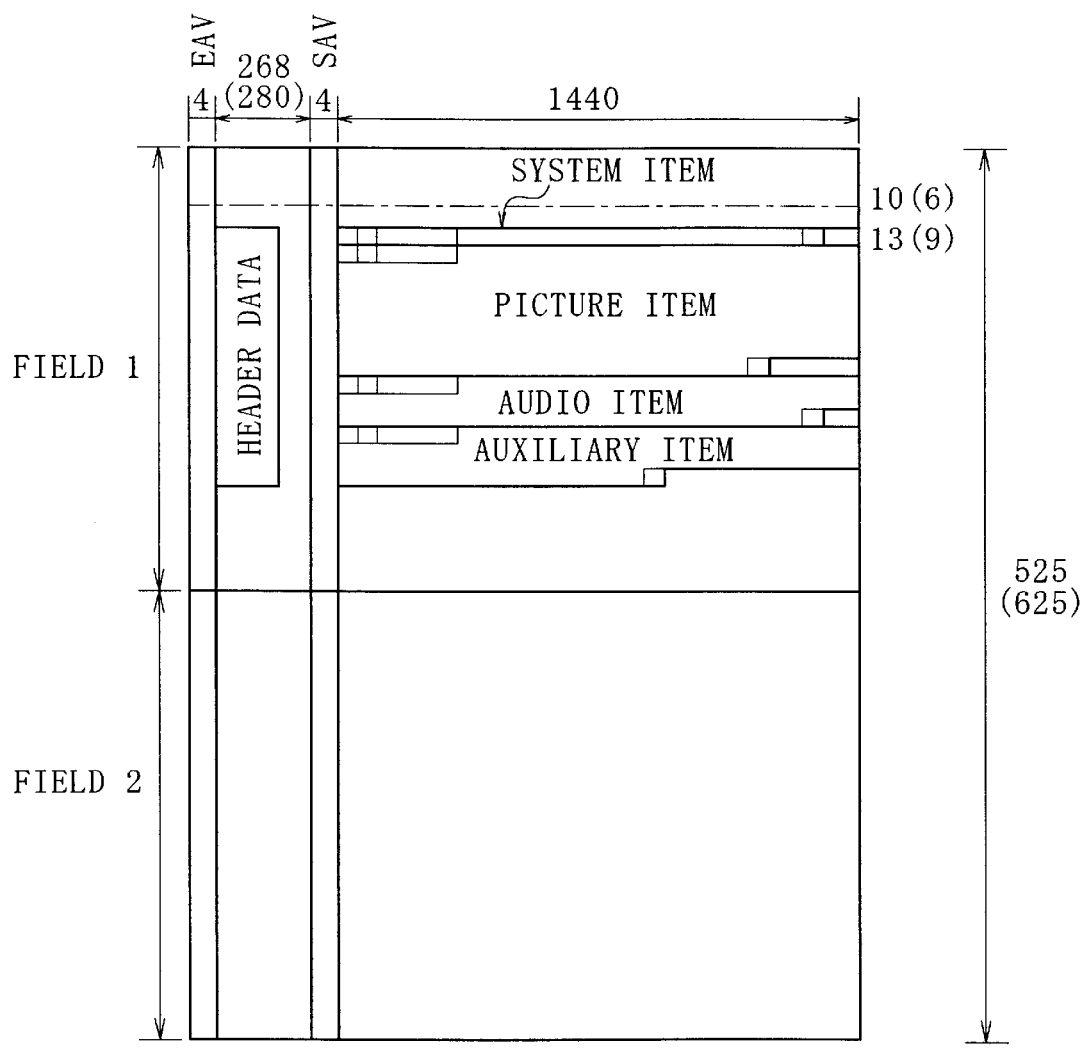
FIG. 1 is a diagram to which reference will be made in explaining the SDTI-CP format.

Here, data of respective items may be inserted into the payload area of the SDTI format as the contents packages, and the codes EAV and SAV of the SDI format may be added to the data of the respective items to thereby obtain data of the format shown in FIG. 1. When data of the format (hereinafter referred to as "SDTI-CP format") shown in FIG. 1 is transmitted, similarly to the SDI format and the SDTI format, this data may be P/S-converted and encoded in transmission line and thereby transmitted as serial data whose transmission rate is 270 Mbps, or the like.

Incidentally, in FIG. 1, numerals within the parentheses may represent numerical values of the PAL625 system video signal. Numerals without parentheses may represent numerical values of the NTSC525 system video signal. Only the NTSC system will be described below.

Figure 2:
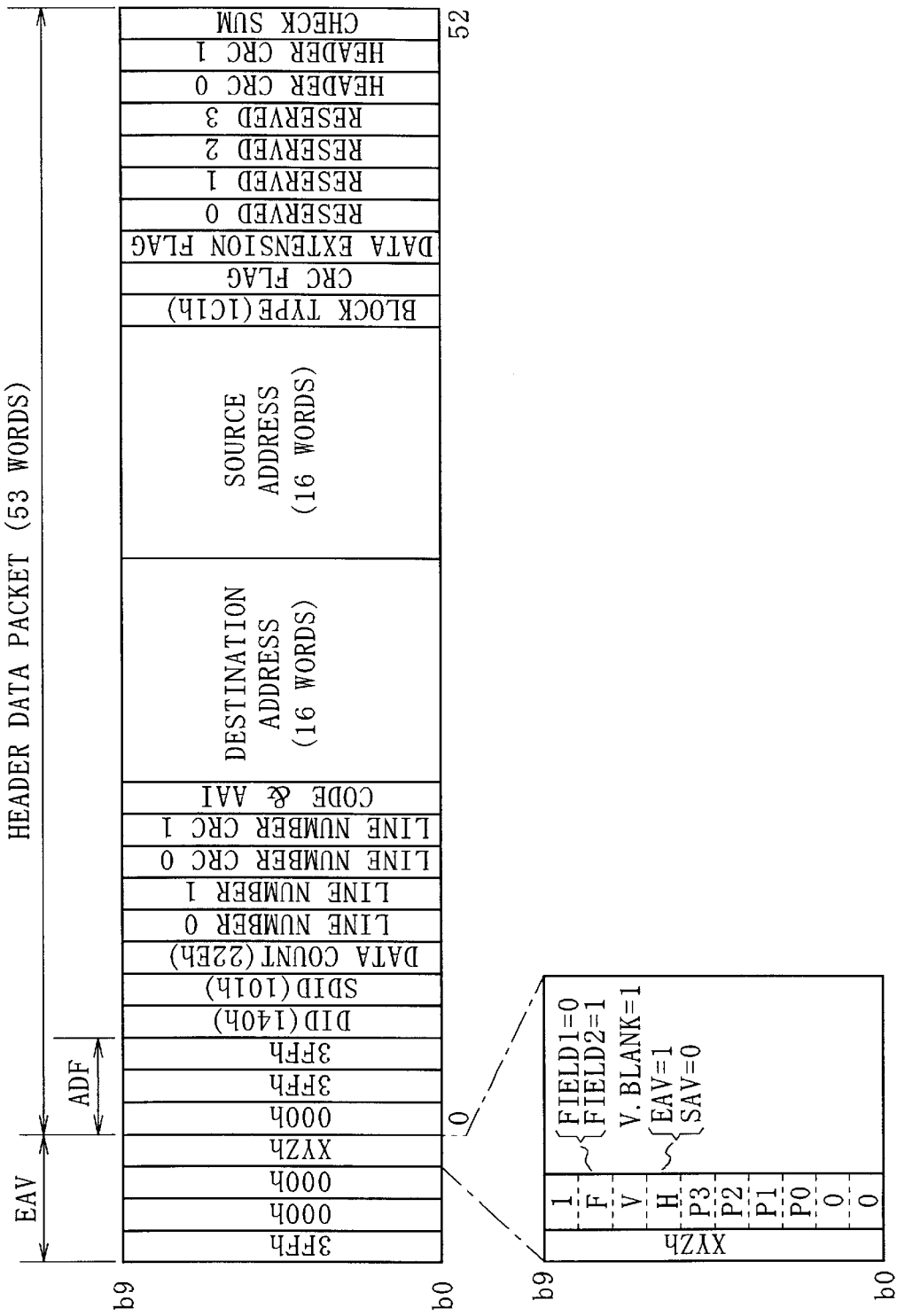
FIG. 2 is a diagram showing an arrangement of a header provided within an ancillary data portion of the SDTI-CP format.

FIG. 2 shows arrangements of the code EAV and header data (Header Data) contained in the ancillary data area.

The code EAV may comprise 3FFh, 000h, 000h, XYZh (h may represent the hexadecimal notation, which will apply for the following description as well).

In the "XYZh", a bit b9 may be set to "1", and bits b0, b1 may be set to "0". A bit b8 may be a flag which may indicate whether the field is the first field or the second field. A bit b7 may be a flag which may indicate the vertical blanking period. Also, a bit b6 may be a flag which may indicate whether the 4-word data is the EAV or the SAV. The flag of this bit b6 may be held at "1" when the 4-word data is the EAV, and may be held at "0" when the 4-word data is the SAV. Also, bits b5 to b2 may be data which may be used to detect and correct errors.

Next, to the leading portion of the header data, there may be located fixed patterns 000h, 3FFh, 3FFh as header recognition data "ADF (Ancillary data flag). The fixed patterns may be followed by "DID (Data ID)" and "SDID (Secondary data ID)" which may indicate the attribute of the ancillary data area. In the "DID" and "SDID", there may be located fixed patterns 140h, 101h which may indicate that the attribute is a user application.

"Data Count" may indicate the number of words of the header data, and the number of words may be set to 46 words (22Eh). This header data may comprise data ranging from "Line Number-0" to "Header CRC1".

"Line Number-0, Line Number-1" may be data which may indicate a television line number. In the NTSC525 system, these two words may represent the line numbers 1 to 525 of the video frame. Also, in the PAL625 system, these two words may represent the line numbers 1 to 625 of the video frame.

The "Line Number-0, Line Number-1" may be followed by "Line Number CRC0, Line Number CRC1". This "Line Number CRC0, Line Number CRC1" may represent values of CRC (cyclic redundancy check codes) for 5 words ranging from "DID" to "Line Number-1", and may be used to check transmission errors.

"Code & AAI (Authorized address identifier)" may indicate information such as the setting of the word length of the payload portion ranging from the SAV to the EAV and the type of the data format of the addresses on the transmission side and the reception side.

"Destination Address" may be an address of the data reception side (destination) and "Source Address" may be an address of the data transmission side (source). "Block Type" which may follow "Source Address" may represent the type of the payload portion, e.g. whether the payload portion is of the fixed length type or the variable length type. When the payload portion is of the variable length type, compressed data may be inserted. In the SDTI-CP format, when the content item is generated by using compressed video data, for example, the data quantity may be changed depending upon every frame so that a variable length block (Variable Block) may be used. Therefore, "Block Type" of the SDTI-CP format may be set to fixed data 1C1h.

"CRC Flag" may be a flag used to indicate whether or not a CRC is located at the last two words of the payload portion PAD. Also, "Data extension flag" which may follow the "CRC Flag" may indicate whether or not the user data packet is extended.

The "Data extension flag" may be followed by a 4-word "Reserved" area. The next "Header CRC 0, Header CRC 1" may represent values of CRC (cyclic redundancy check codes) for "Code & AAI" to "Reserved3", and may be used to check transmission errors. "Check Sum" may be a Check Sum code for all header data, and may be used to check transmission errors.

Figure 3:
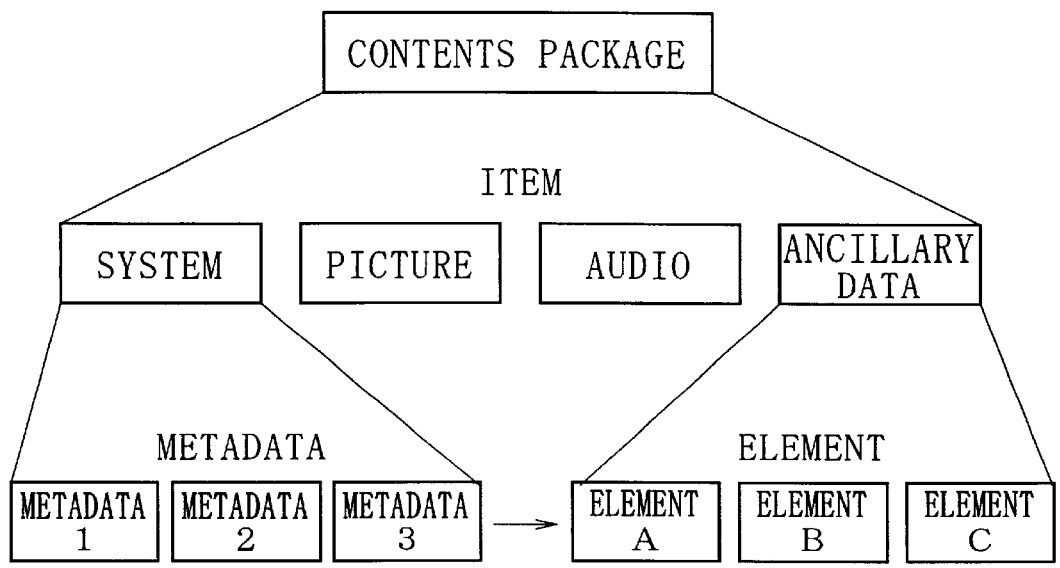
FIG. 3 is a diagram showing a fundamental arrangement of a contents package.

Next, the contents package inserted into the payload portion PAD of the video frame will further be described with reference to FIG. 3. FIG. 3 shows a fundamental arrangement of the contents package.

Each contents package may comprise up to four items, each of which may comprise one or more elements. These four items may be respective system item, picture item, audio item and ancillary data item.

Fundamentally, the picture and audio items may be stream elements which may be used to transport direct constituents of television. These two items may be frequently transmitted to an exclusively-used storage or processing device. Ancillary data may be used to transport contents mainly comprising data, such as sub-title or teletext data. The ancillary data may be frequently created on the computer, processed and then stored therein.

When a digital delivery service increases, it can be expected that the number, volume and complexity of ancillary data type will increase. Finally, the system item may provide services for package on the whole through package metadata like a time stamp, metadata for respective elements of other three items and downstream package control element. Each of picture, audio and ancillary data items can comprise up to 255 elements, for example.

FIG. 1 shows a data structure obtained when the contents package comprising the four items of system item, picture item, audio item and ancillary data item is inserted into the payload portion of the video frame.

FIG. 4 shows the layout of the contents package using the example of GOP of the MPEG-2 (see hatched portions). A series of contents package may be generated by packaging each frame of encoded video data together with other data.

Then, on the SDTI format, video data may be scanned from the first field to the second field of each frame rightwards and transferred. In this case, although video data of each frame is encoded to video data of different data quantity, the encoded video data of each frame may be transmitted in correspondence with each frame interval.

Incidentally, each contents package should contain the system item and may be completed by any of other items. The system item may be located at the leading portion in order to recognize the starting point of the contents package. Specifically, this system item may begin with the 13th line according to the NTSC system, and may begin with the 9th line according to the PAL system. Also, in one contents package, of the items of the above-mentioned four types, it is frequently observed that there may be only one type of item.

Figure 5:
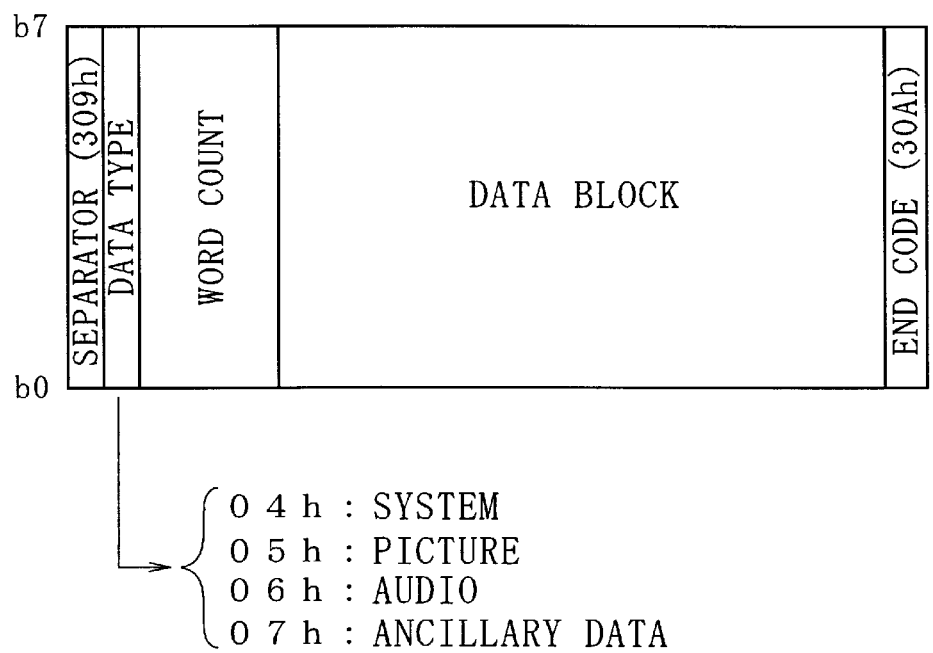
FIG. 5 is a diagram showing an arrangement of an SDTI variable-length block.

Each item may be arranged as an SDTI variable length block which may begin with "Separator" and end with "End Code" as shown in FIG. 5. The "Separator" may be started immediately after the start synchronizing code SAV. The value of "Separator" may be set to "309h", and the value of "End Code" may be set to "30Ah". "Word Count" may indicate the number of words of "Data Block", and the "Data Block" may be data of each item.

"Data Type" may be used to indicate the type of packaged data, i.e. type of item data. A value of "Data Type" may be set to "04h" when the packaged data is the system item, for example, may be set to "05h" when the packaged data is the picture item, may be set to "06h" when the packaged data is the audio item, and may be set to "07h" when the packaged data is the ancillary data item. The leading portion of the contents package may be detected by detecting "Data Type" code of the system item.

Incidentally, the input format of each SDTI variable length block may be 8-bit data of bits b0 to b7 comprising a part of 10-bit word. Bits b8 and b9 may both be set to "1" for "Separator" word and "End Code" word. For each word of "Data Type", "Word Count", "Data Block", in accordance with the SDTI format, the bit 8 may become an even parity of bits b0 to b7 and the bit b9 may become an odd parity.

Figure 6:
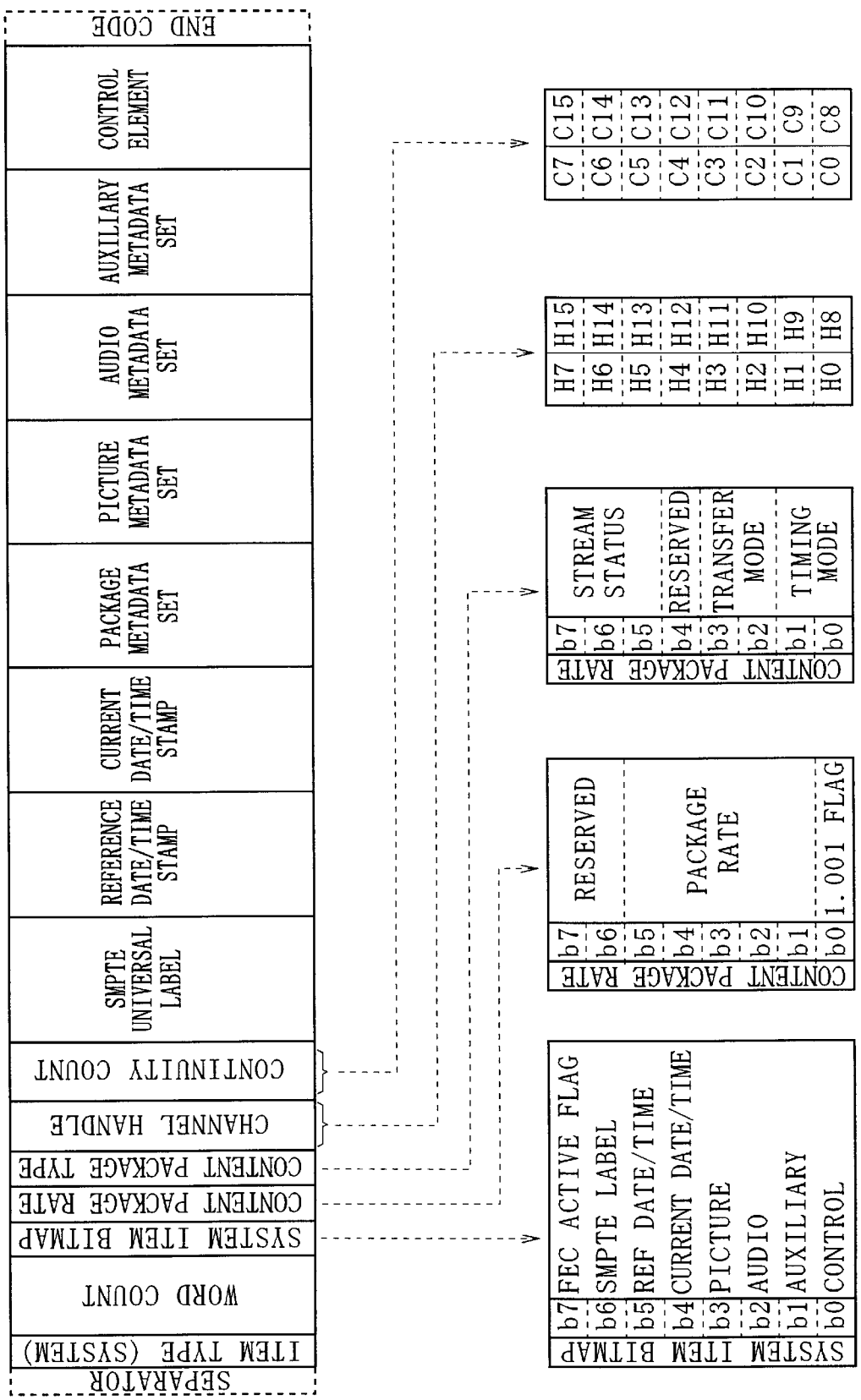
FIG. 6 is a diagram showing an arrangement of a system item.

FIG. 6 shows the arrangement of the system item. "System Item Type" and "Word Count" may be equivalent to "Data Type" and "Word Count" of the above-mentioned variable length block, respectively. This system item may contain package metadata and control data as well as metadata for elements of the respective picture, audio and ancillary data items.

This system item may begin with a 7-word system item header which may be followed by an SMPTE universal label, time stamps, package, picture, audio and ancillary data metadata sets and further a control element.

The system item may comprise one-word "System Item Bitmap", one-word "Content Package Rate", one-word "Content Package Type" containing "stream status", 2-word "Channel Handle" and 2-word "Continuity Count".

The "System Item Bitmap" will be described. A bit b7 may be a flag which may indicate whether or not an error-correcting code is added to data. If this flag is held at "1", then it may be determined that the error-correcting code is added to data. A bit b6 may be a flag which may indicate whether or not the system item contains information of "SMPTE Universal Label". If this flag is held at "1", then it may be determined that the system item contains the information of "SMPTE Universal Label".

Bits b5 and b4 may be flags which may indicate whether or not the system item contains "Reference Date/Time stamp" and "Current Date/Time stamp". The "Reference Date/Time stamp" may indicate a time or a date at which a contents package, for example, was created first. The "Current Date/Time stamp" may indicate a time or a date at which the contents package was corrected last.

A bit b3 may be a flag which may indicate whether or not the picture item follows this system item, a bit b2 may be a flag which may indicate whether or not the audio item follows this system item, and a bit b1 may indicate whether or not the ancillary data item follows this system item. If these flags are held at "1", then it can be determined that the respective items exist behind this system item.

A bit b0 may be a flag which may indicate whether or not this system item contains the control element. If this flag is held at "1", then it can be determined that the control element may exist within this system item. Incidentally, although not shown, bits b8, b9 may be added to the system item and thereby data may be transmitted as 10-bit data.

"Content Package Rate" will be described. Bits b7 to b6 may be used as a reserved area (Reserved), and bits b5 to b1 may indicate a package rate (Package Rate) which might be a package rate per second in the one-time normal speed operation mode. A bit b0 may be a 1.001 flag. If this flag is set to "1", then it can be determined that the package rate is 1/1.001 times the normal speed.

"Content Package Type" will be described. Bits b7 to b5 may be a "Stream Status" flag which may be used to discriminate the position of the picture unit within the stream. This 3-bit "Stream Status" flag may represent the following 8 kinds of the states.

0: This picture unit does not belong to any of a pre-roll (pre-roll) interval, an editing interval and a post-roll (post-roll) interval.

1: This picture unit is a picture contained in the pre-roll interval and which is followed by the editing interval.

2: This picture unit is the first picture unit of the editing interval.

3: This picture unit is the picture unit contained in the intermediate portion of the editing interval.

4: This picture unit is the last picture unit of the editing interval.

5: This picture unit is the picture unit contained in the post-roll interval.

6: This picture unit is the first and last picture units of the editing interval (state in which there exists only one picture unit of the editing interval).

7: Reserved.

Also, a bit b4 may be used as a reserved area (Reserved). "Transfer Mode" of bits b3, b2 may indicate a transmission mode of a transmission packet. Also, "Timing Mode" of bits b1, b0 may indicate a timing mode. If the value represented by the bits b3, b2 is held at "0", then it can be determined that the transfer mode is a synchronous mode (Synchronous mode). If such value is held at "1", then it can be determined that the transfer mode is an isochronous mode (Isochronous mode). If such value is held at "2", then it can be determined that the transfer mode may be an synchronous mode (Asynchronous mode). If the value represented by the bits b1, b0 is held at "0", then it can be determined that the timing mode may be a normal timing mode (Normal timing mode) in which the transmission of contents package of one frame is started at a timing of a predetermined line of the first field. If such value is held at "1", then it can be determined that the timing mode may be an advanced timing mode (Advanced timing mode) in which such transmission is started at a timing of a predetermined line of the second field. If such value is held at "2", then it can be determined that the timing mode may be a dual timing mode (Dual timing mode) in which such transmission may be started at a timing of predetermined lines of the first and second fields.

"Channel Handle" will be described. This "Channel Handle" word may be used to discriminate contents packages of respective programs when contents packages of a plurality of programs are multiplexed and then transmitted. The multiplexed contents packages can be separated at every program by discriminating the 16-bit value of this "Channel Handle" word.

"Continuity Count" will be described. The "Continuity Count" may be a 16-bit modulo counter. This counter may count data at every picture unit in the ascending order, and may count data independently in the respective streams. Therefore, when the stream is switched by a stream switcher or the like, the values of this counter may become discontinuous, thereby making it possible to detect the switching point (editing point). Incidentally, since this counter is the 16-bit ($2^{16}$=65536) modulo counter and may be very large as described above, there is the lowest probability that the values of the counter will agree with each other accidentally at the switching point in the two switched streams. Thus, it is possible to provide a sufficiently high accuracy for detecting the switching point in actual practice.

The "Continuity Count" will be followed by "SMPTE Universal Label", "Reference Date/Time stamp" and "Current Date/Time stamp" as set forth above. Further, these metadata sets will be followed by "Package Metadata Set", "Picture Metadata Set", "Audio Metadata Set" and "Auxiliary Metadata Set" in response to the packaged items to thereby indicate information of contents package such as a program title and information concerning packaged item of picture, audio or ancillary data. Incidentally, "Picture Metadata Set", "Audio Metadata Set" and "Auxiliary Metadata Set" may be provided if it can be determined by the "System Item Bitmap" flag that the corresponding item is contained in the contents package.

Further, these metadata sets can be followed by "Control Element". This "Control Element" may comprise 1-byte element type identifier and the following 4-byte word count and control element data.

The above-mentioned "Time stamp" will be further described. 17 bytes may be assigned to this "Time stamp". The first 1 byte may be used to discriminate "Time stamp", and the remaining 16 bytes may be used as a data area. The first 8 bytes of the data area may indicate the time code (Time-code) that is standardized as SMPTE12M, for example. The following 8 bytes may be invalid data.

Figure 7:
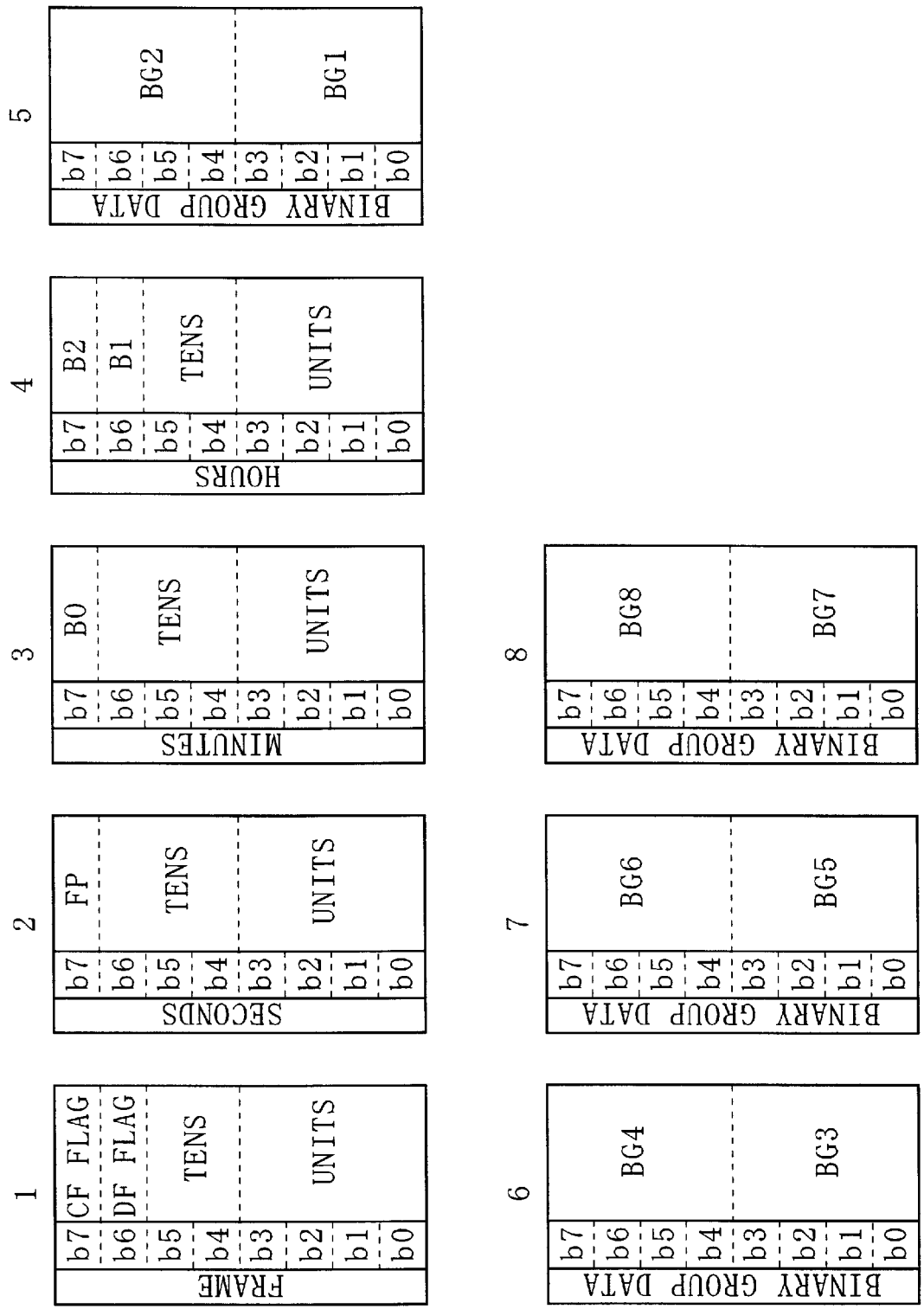
FIG. 7 is a diagram showing an arrangement of a time code standardized as the SMPTE-12M.

FIG. 7 shows the arrangement of the time code that was standardized as the SMPTE-12M. This time code may comprise "Frame", "Seconds", "Minutes", "Hours" and a 4-byte "Binary Group Data".

"Frame" will be described. A bit b7 may be a color frame flag (Color Frame Flag). It can be determined by this color frame flag whether the color frame is the first color frame or the second color frame. A bit b6 may be a drop frame flag (Drop Frame Flag). It can be determined by this drop frame flag whether the video frame inserted into the picture item is the drop frame or not. Then, bits b5, b4 may represent the second digit of the frame, and bits b3 to b0 may represent the first digit of the frame.

"Seconds" will be described. A bit b7 may indicate a field phase (NTSC) or binary group 0 (PAL). Therefore, in the case of the NTSC system, it can be determined by this bit b7 that the field is the first field or the second field. Then, bits b6 to b4 may represent the second digit of the second, and bits b3 to b0 may represent the first digit of the second.

"Minutes" will be described. A bit b7 may indicate a binary group 0 (NTSC) or a binary group 2 (PAL). Then, bits b6 to b4 may represent the second digit of the minute, and bits b3 to b0 may represent the first digit of the minute.

"Hours" will be described. A bit b7 may indicate a binary group 1, and a bit b6 may indicate a binary group 2 (NTSC) or a field phase (PAL). Therefore, in the case of the PAL system, it can be determined by this bit b6 whether the field is the first field or the second field. Then, bits b5, b4 may represent the second digit of the hour, and bits b3 to b0 may represent the first digit of the hour.

Also, it may be determined by 3 bits B0 to B0 of the bit b7 of the above-mentioned "Minutes" and bit b7, b6 of "Hours" (3 bits FP, B0, B2 of bit b7 of "Seconds", "Minutes", "Hours" according to the PAL system) whether or not BG1 to BG8 of "Binary Group Data" contain data. This "Binary Group Data" is able to display the date in Gregorian Calendar (Gregorian Calender) and Julian Calendar (Julian Calender), for example, by two digits.

The above-mentioned "Metadata Set" will further be described. FIG. 8 shows the arrangement of "Metadata Set". "Metadata Set" may begin with 1-word "Metadata Count" which may define the number of words of "Metadata Block" within the set. A metadata count value of "00h" may be a valid value and may indicate the absence of "Metadata Block". In this case, "Metadata Set" may become only 1-word length.

FIG. 9A shows the arrangement of "Package Metadata Block". This "Package Metadata Block" may begin with 1-word "Metadata Type" which will be followed by a 2-word "Word Count" (FIG. 9C) and which will be completed by "Metadata" itself. The "Metadata Type" word may indicate the type of "Metadata". "Word Count" may indicate the number of words up to the end of the block (equivalent to "Word Count" of variable length block).

FIG. 9B shows the arrangement of "Item Metadata Block". Similarly to the above-mentioned "Package Metadata Block", this "Item Metadata Block" may begin with 1-word "Metadata Type" which will be followed by a 2-word "Word Count" (FIG. 9C). Further, the 2-word word count will be followed by 1-word "Element Type" and 1-word "Element Number" and may end with "Metadata" itself. "Element Type" and "Element Number" may be information which are used to uniquely link associated elements of picture, audio and ancillary data items.

Figure 10:
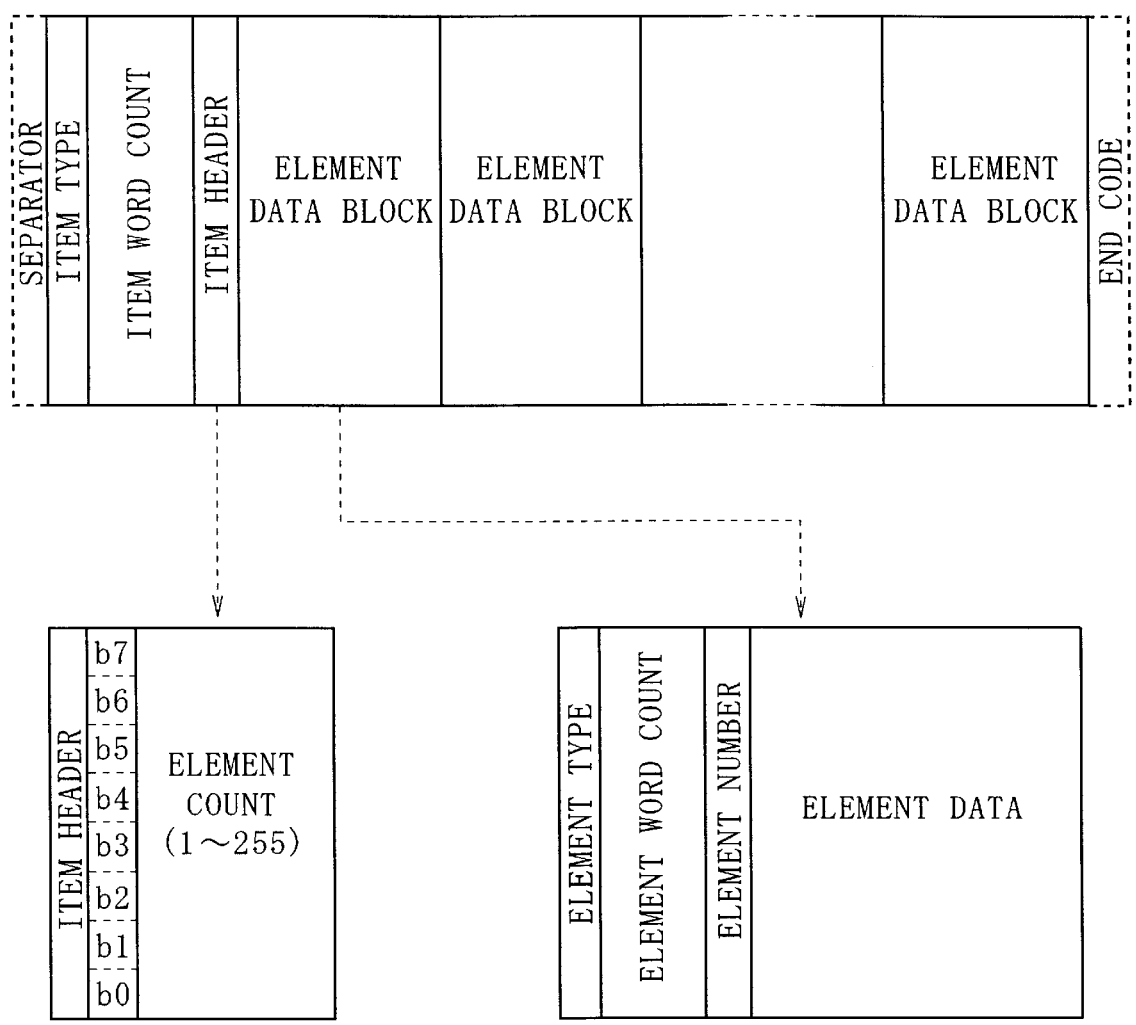
FIG. 10 is a diagram showing arrangements of picture, audio and ancillary data items.

Next, the arrangements of the picture, audio and ancillary data items will be described. FIG. 10 shows the arrangements of these items. These items may begin with 1-word "Item Type" which will be followed by a 4-word "Word Count" and 1-word "Item Header" and which will be followed by "Element Data Block". "Item Type" may indicate the type of item as described above, and may be set to "05h" if the item type is the picture item, may be set to "06h" if the item type is the audio item, and may be set to "07h" if the item type is the ancillary data item. "Item Word Count" may indicate the number of words up to the end of this block (equivalent to "Word Count" of variable length block).

"Item Header" may indicate the number of words of "Element Data Block". "Element Data Block" may be used as the item data area. Here, since "Item Header" may be 8 bits and indicate the number of words of "Element Data Block", the number of "Element Data Block" may fall within a range of from 1 to 255 (0 is not valid).

"Element Data Block" may begin with "Element Type" of one word, may be followed by a 4-word "Element Word Count" and 1-word "Element Number", and may end with "Element Data". "Element Type" and "Element Word Count" may indicate the type of data and the data quantity. "Element Word Count" may have the same format as that prescribed by the SMPTE-305M, and the value is "Element Data" word length in which "1" may be added to "Element Number". "Element Number" may indicate the order of "Element Data Block".

An MPEG-2 image element which may be one of elements will be described. The MPEG-2 image element may be MPEG-2 video elementary stream (V-ES) of any profile or level. The profile or level may be defined by a decoder template document.

Figure 11:
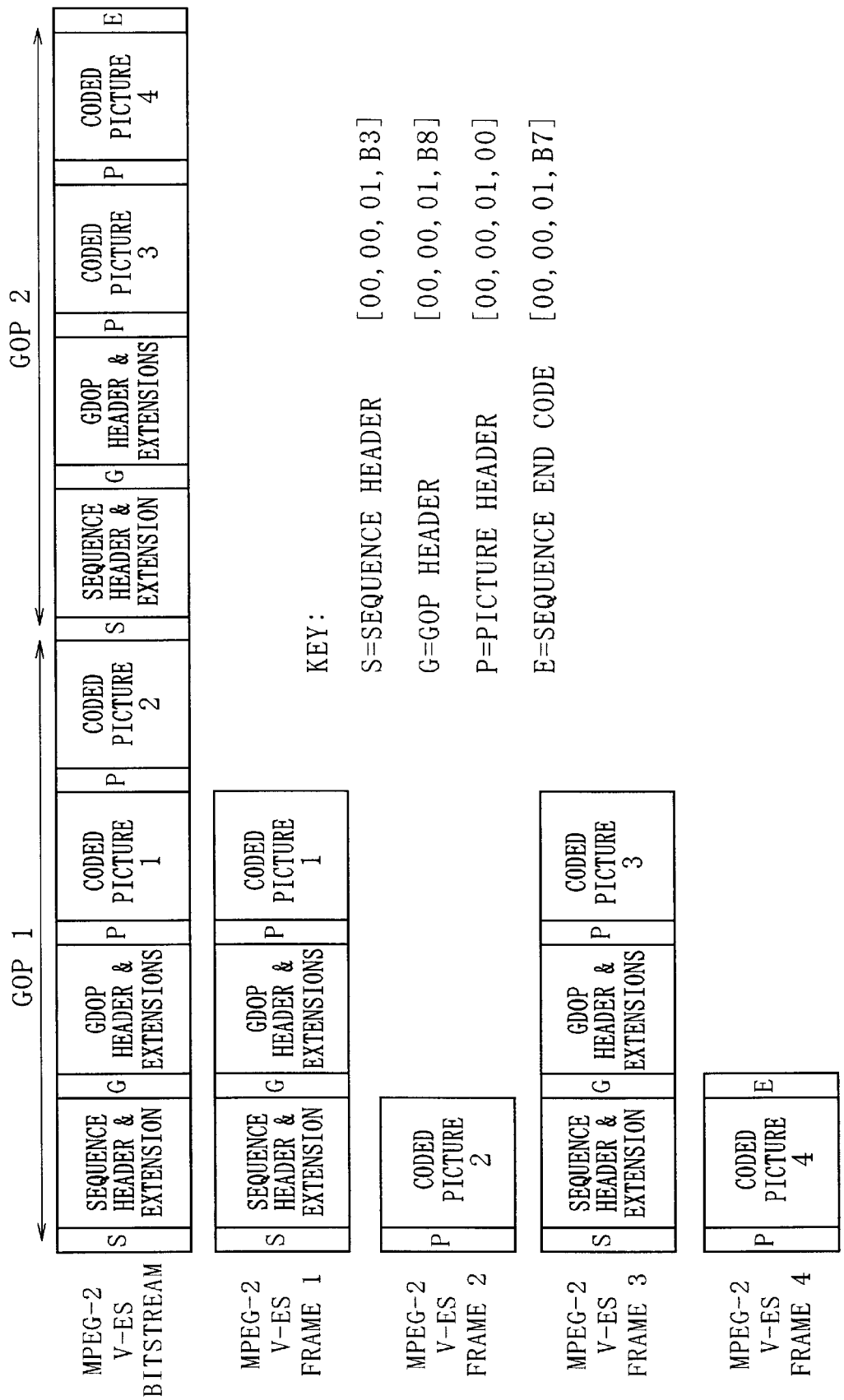
FIG. 11 is a diagram showing an example of an MPEG-2 V-ES format in the SDTI-CP element frame.
Figure 17:
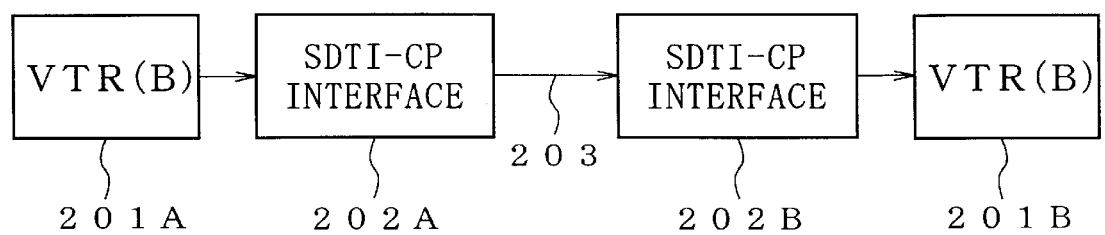
FIG. 17 is a block diagram showing an example of a transmission system used when a VTR editing is implemented.
Figure 18:
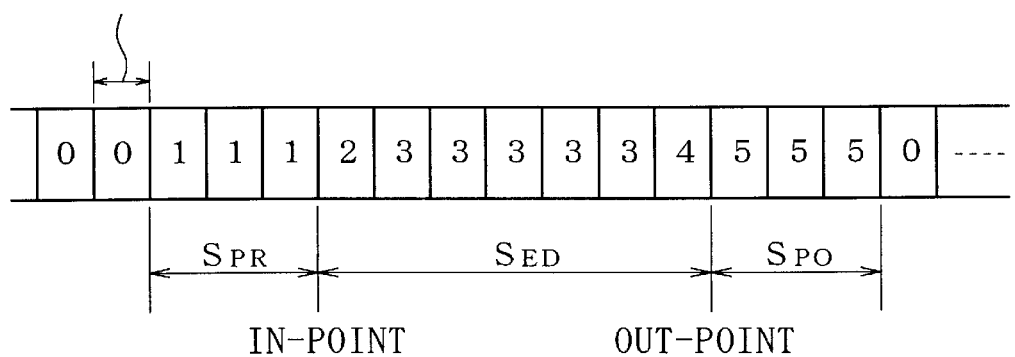
FIG. 18 is a diagram showing an example of the manner in which "Stream Status" flag is set.
Figure 19:
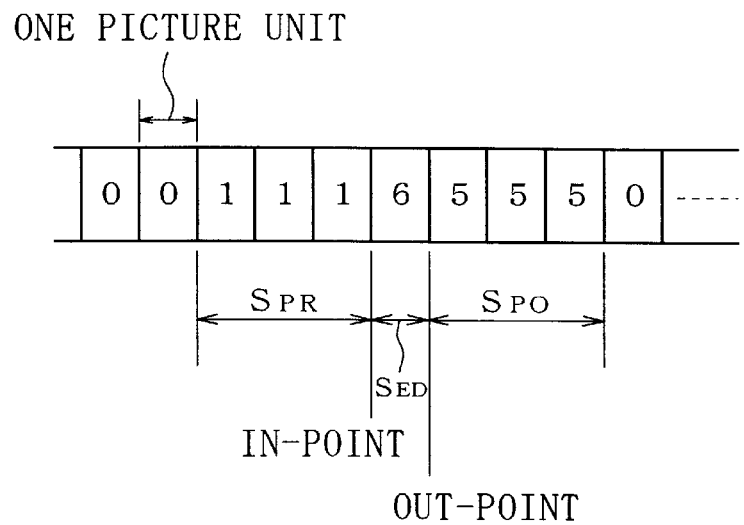
FIG. 19 is a diagram showing another example of the manner in which "Stream Status" flag is set.
Figure 20:
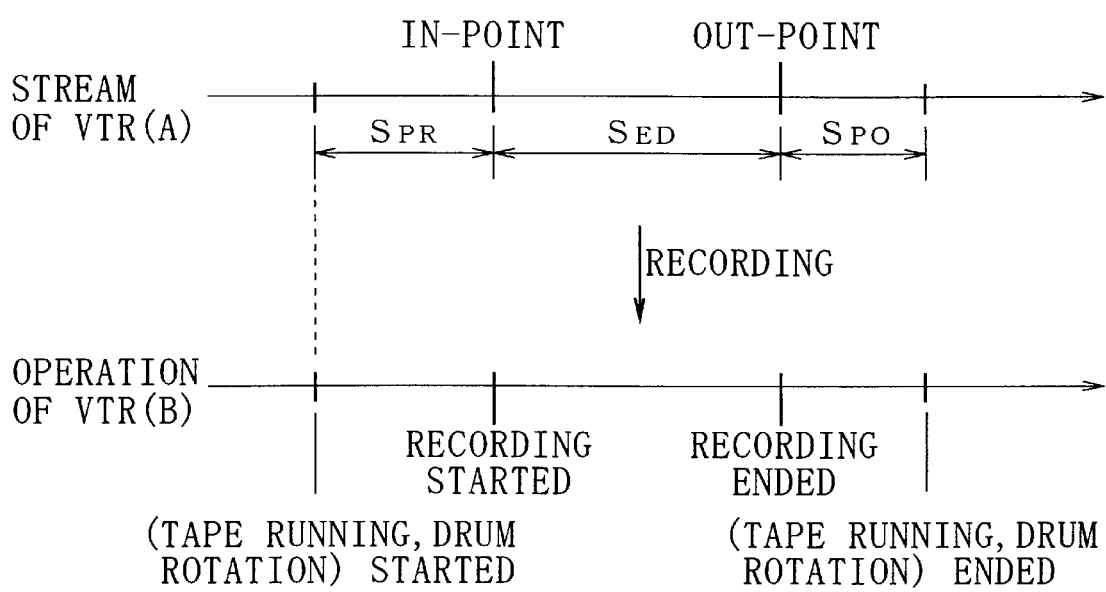
FIG. 20 is a diagram to which reference will be made in explaining the manner in which a VTR editing is executed by using "Stream Status".

FIG. 11 shows an example of a format of MPEG-2 V-ES in the SDTI-CP element frame. This example may be a V-ES bit stream example which may specify (in accordance with the SMPTE recommended practice) the key, i.e. MPEG-2 start code. The MPEG-2 V-ES bit stream may be simply formatted to the data block as shown in the figure.

Next, an 8-channel AES-3 element which may be one of elements will be described. Although this element may be inherently used to transport non-compressed AES-3 audio data up to the 8 channels, it can transport compressed bit stream which was already encoded as the AES-3 signal and other non-audio data.

FIG. 12 shows the arrangement of the 8-channel AES-3 element. This element may comprise "Element Header", "Audio Sample Count", "Stream Valid Flags" and "AES-3 Data Area".

"Element Header" will be described. A bit b7 may be a "FVUCP Valid Flag" which may determine whether or not FVUCP defined in the AES-3 format standardized by AES (Audio Engineering Society) is set by audio data of AES-3 format of "Data Area". Bits b6 to b3 may be a reserved area (Reserved), and bits b2 to b0 may indicate the sequence number (5-sequence count) of the 5-frame sequence.

The 5-frame sequence will be described. When the audio signal synchronized with a video signal of (30/1.001) frame/second in the scanning line in which one frame may comprise 525 lines and whose sampling frequency is 48 kHz is divided into every block of each frame of a video signal, the number of samples per one video frame may become 1601.6 samples and may not become an integral value. Therefore, the sequence in which there are provided two frames of frame of 1601 samples and there are provided three frames of frame of 1602 samples so that 5 frames may provide 8008 samples may be called a 5-frame sequence.

FIG. 13 shows the 5-frame sequence. That is, in synchronism with the reference frame, the frames of sequence numbers 1, 3, 5, for example, may be set to 1602 samples and the frames of sequence numbers 2, 4 may be set to 1601 samples. This sequence number may be indicated by bits b2 to b0 of the above-mentioned "Element Header".

"Audio Sample Count" will be described. This "Audio Sample Count" may be a 16-bit counter within a range of 0 to 65535 by using bits c15 to c0 and may indicate the number of samples of each channel. Incidentally, within the element, it may be assumed that all channels have the same value.

"Stream Valid Flags" will be described. The "Stream Valid Flags" may be used to indicate whether or not each stream of 8 channels is valid. If each channel contains meaningful audio data, then a bit corresponding to this channel may be set to "1" and other bits may be set to "0". There may be transmitted only audio data of channel in which a bit may be set to "0".

"AES-3 Data Area" will be described. "s2 to s0" of this "Data Area" may be a data area which may be used to discriminate each stream of 8 channels. "F" may indicate the start of the sub-frame. "a23 to a0" may indicate audio data, "P, C, U, V" may indicate channel status, user bit, Validity bit, parity or the like.

A general-purpose data format (General Data Format) will be described next. This general-purpose data format may be used to transport all free form data types. However, this free form data type does not contain a special ancillary element type such as an IT nature (word processing file, hypertext, etc.).

The MPEG-2 image editing metadata which may be one of metadata will be described next. This metadata may be a combination of editing and error metadata, compression-coded metadata and source-coded metadata. These metadata can be inserted into mainly the above-mentioned system items and further into the ancillary data item.

FIGS. 14A to C show "Picture Editing Bitmap" area, "Picture Coding" area and "MPEG User Bitmap" area provided within the MPEG-2 image editing metadata inserted into the "Picture Metadata Set" of the system item shown in FIG. 6, respectively. Further, it can be considered that "Profile/Level" area indicative of the profile and level of the MPEG-2 and video index information defined by the SMPTE186-1995 may be provided in this MPEG2-image editing metadata.

FIG. 14A shows "Picture Editing Bitmap" of one word. Bits b7 and b6 may be "Edit flag" and may be a flag which indicates editing point information. This 2-bit flag may represent the following 4 kinds of the states.

00: No editing point;

01: The editing point is located ahead of a picture unit with this flag attached thereto (Pre-picture edit);

10: The editing point is located behind the picture unit with this flag attached thereto (Post-picture edit);

11: Only one picture unit is inserted and the editing point is located ahead of and behind the picture unit with this flag attached thereto (single frame picture).

That is, the flag which may indicate whether or not the video data (picture unit) inserted into the picture item is located ahead of the editing point, whether or not the video data is located behind the editing point and whether or not the video data is located between two editing points may be inserted into the "Picture Editing Bitmap" area of the "Picture Metadata Set" (see FIG. 6).

Bits b5 and b4 may be "Error flag". This "Error flag" may indicate whether or not the picture contains errors that cannot be corrected, whether or not the picture contains a conceal error, whether or not the picture does not contain errors and whether or not the picture is placed in the unknown state. A bit b3 may be a flag which may indicate whether or not "Picture Coding" is located in this "Picture Metadata Set" area. If this flag is held at "1", then it can be determined that "Picture Coding" is contained in the picture metadata set.

A bit b2 may be a flag which may indicate whether or not "Profile/Level" is contained in the metadata block. If this flag is held at "1", then it can be determined that "Profile/Level" is contained in the "Metadata Block". This "Profile/Level" may represent MP@ML, HP@fHL or the like which may indicate the profile and level of MPEG.

A bit b1 may be a flag which may indicate whether or not "HV Size" is contained in the metadata block. If this flag is held at "1", then it can be determined that "HV Size" is contained in the "Metadata Block". A bit b0 may be a flag which may indicate whether or not "MPEG User Bitmap" is contained in the metadata block. If this flag is held at "1", then it can be determined that "MPEG User Bitmap" is contained in the "Metadata Block".

FIG. 14B shows the arrangement of one-word "Picture Coding". A bit b7 may have "Closed GOP" provided therein. This "Closed GOP" may indicate whether or not GOP (Group Of Picture) obtained upon MPEG-compression is Closed GOP.

"Broken Link" may be assigned to a bit b6. This "Broken Link" may be a flag which may be used by the decoder side to control the reproduction. That is, although the respective pictures of MPEG are arranged in the sequential order of B picture, B picture, I picture . . . , there is then the risk that when a different stream is connected to the stream due to the editing point, B picture of the switched stream, for example, will be decoded with reference to P picture of the stream which is not yet switched. If this flag is set, then it is possible to prevent the decoder side from executing the above-mentioned decoding.

"Picture Coding Type" may be assigned to bits b5 to b3. This "Picture Coding Type" may be a flag which may indicate whether the picture is the I picture, the B picture or the P picture. Bits b2 to b0 may be a reserved area (Reserved).

FIG. 14C shows the arrangement of one-word "MPEG User Bitmap". "History data" may be assigned to a bit b7. This "History data" may be a flag which may indicate whether or not encoded data such as quantization step, macro-type or motion vector required by the encoding of the previous generation is inserted into the user data area existing within "Metadata" as History data. "Anc data" may be assigned to a bit b6. This "Anc data" may be a flag which may indicate whether or not data inserted into the ancillary area (e.g. data necessary for MPEG compression, etc.) is inserted into the above-mentioned user data area as Anc data.

"Video index" may be assigned to a bit b5. This "Video index" may be a flag which may indicate whether or not Video index information is inserted into the Video index area. This Video index information may be inserted into a 15-byte Video index area. In this case, the insertion positions may be determined at every class of five classes (classes of 1.1, 1.2, 1.3, 1.4 and 1.5). Video index information of 1.1 class, for example, may be inserted into the first 3 bytes.

"Picture order" may be assigned to a bit b4. This "Picture order" may be a flag which may indicate whether or not the order of the respective picture in the MPEG stream is changed. Incidentally, the change of the order of the respective pictures in the MPEG stream may become necessary upon multiplexing.

"Timecode 2", "Timecode 1" may be assigned to bits b3, b2. The "Timecode 2", "Timecode 1" may be flags which may indicate whether or not a VITC (Vertical Interval Time Code) and an LTC (Longitudinal Time Code) are inserted into the areas of the Timecode 2, 1. "H-Phase", "VPhase" may be assigned to bits b1, b0. The "H-Phase", "V-Phase" may be flags which may indicate from which horizontal pixel and vertical line information may be encoded, i.e. frame information used in actual practice may exist in the user data area.

Next, audio editing metadata which may be one of metadata will be described. This metadata may be a combination of editing and error metadata and source-encoded metadata. These metadata can be inserted into mainly the above-mentioned system item and further into the ancillary data item.

FIGS. 15A to D show "Field/Frame flags" area, "Audio Editing Bitmap" area, "CS Valid Bitmap" area and "Channel Status Data" area which may be provided within the audio editing metadata inserted into "Audio Metadata Set" area of the system item shown in FIG. 6, respectively.

Here, the number of valid audio channels can be discriminated by the above-mentioned "Stream Valid Flags"of FIG. 12. If "Stream Valid Flags" is held at "1", then "Audio Editing Bitmap" becomes valid.

FIG. 15A shows "Field/Frame flags"of one word. This flag may correspond to audio data of first to eight channels of bits b7 to b0. If this flag is held at "0", then it can be indicated that data is packed at the frame unit. If this flag is held at "1", then it can be indicated that data is packed at the field unit.

FIG. 15B shows "Audio Editing Bitmap" of one word. "First edit flag" of bits b7, b6 may indicate information concerning the editing situation of the first field. "First edit flag"of bits b5, b4 may indicate information concerning the editing situation of the first field. Bits b3, b2 may be "Error flag". This "Error flag"may indicate whether or not errors that cannot be corrected occur. Bits b1, b0 may be a reserved area (Reserved).

FIG. 15C shows "CS Valid Bitmap" of one word. This "CS Valid Bitmap" may be a header of "Channel Status Data" of n (n=6, 14, 18 or 22) bytes shown in FIG. 15D and indicate which channel status word of 24 channel status words exist within the data block. Here, "CS Valid 1" of bit b7 may be a flag which may indicate whether or not data exists in a range of from 0 to 5 bytes of "Channel Status Data". Similarly, "CS Valid2" to "CS Valid4" of bits b6 to b4 may be flags which may indicate whether or not data exist in a range of from 6 to 13 bytes, 14 to 17 bytes and 18 to 21 bytes of "Channel Status Data".

Incidentally, "Channel Status Data" may be formed of 24-byte data. The 22-byte data at the second from the last may determine whether or not data exist in a range of from 0 to 21 bytes. The last 23-byte data may be assigned to a CRC from 0 to 22 bytes.

FIG. 12 shows an example of a transmission system of a stream according to the above-mentioned SDTI-CP format (hereinafter referred to as "SDTI-CP stream"). This transmission system 100 may comprise a storage device 101 formed of a VTR, a server or the like, an SDTI-CP interface 102 and an SDTI-CP stream switcher 103 located on a transmission line 104.

The storage device 101 may accumulate therein a plurality of contents packages. Each contents package may comprise a plurality of items such as the system item, the picture item, the audio item and the ancillary data item as described above. Contents packages sequentially outputted from the storage device 101 may be supplied to the SDTI-CP interface 102. The SDTI-CP interface 102 may insert each contents package into the payload portion of the transmission packet of each video frame of the SDTI format (see FIG. 1), and may transmit such transmission packet to the transmission line 104. Incidentally, when the transmission data (SDTI-CP stream) based on the SDTI-CP format is transmitted as described above, such transmission packet may be P/S-converted, encoded in transmission line and then transmitted as serial data having a transmission rate of 270 Mbps.

Also, the SDTI-CP stream transmitted from the transmission line 104 may be supplied to the SDTI-CP interface 102. The SDTI-CP interface 102 may receive this SDTI-CP stream, may extract each contents package from the payload portion of the transmission packet of each video frame, and may sequentially supply each extracted contents package to the storage device 101. The storage device 101 may sequentially accumulate the contents packages which may be sequentially transmitted from the SDTI-CP interface 102.

Incidentally, the storage device 101 may accumulate MPEG video data and audio data and further metadata themselves instead of the contents package comprising the system item, the picture item, the audio item and the ancillary data item.

In this case, video data, audio data, metadata of every video frame, or the like may be outputted from the storage device 101 and may be supplied to the SDTI-CP interface 102. Then, the SDTI-CP interface 102 may generate the system item, the picture item, the audio item, the ancillary data item or the like from each data and may obtain the contents package of each video frame by packing them. Further, this interface may insert each contents package into the payload portion of the transmission packet of each video frame of the SDTI format, and may transmit such transmission packet to the transmission line 104.

Also, in this case, the SDTI-CP interface 102 which received the SDTI-CP stream from the transmission line 104 may extract each contents package from the payload portion of the transmission packet of each video frame, may further obtain the video data, the audio data, the metadata or the like from the system item, the picture item, the audio item, the ancillary data item or the like comprising such contents package, and may sequentially supply them to the storage device 101. The storage device 101 may accumulate data such as the video data, the audio data and the metadata which are sequentially transmitted from the SDTI-CP interface 102.

Also, the stream switcher 103 in the transmission system shown in FIG. 12 may be a matrix switcher, and the SDTI-CP stream may be switched by this stream switcher 103. With respect to the switching of this SDTI-CP stream, the switching may be executed during the vertical synchronizing (V-sync) interval, to be concrete, at the 10th line according to the NTSC525 system, and at the 6th line according to the PAL625 system.

Next, the manner in which the VTR editing is executed will be described. FIG. 13 shows an example of a transmission system used when the VTR editing is executed. This transmission system 200 may be arranged such that a reproducing-side VTR 201A and an SDTI-CP interface 202A and a recording-side VTR 201B and an SDTI-CP interface 202B are connected by a transmission line 203.

In this case, the contents package reproduced by the VTR 201A or data such as video data, audio data and metadata may be supplied to the SDTI-CP interface 202A, and the SDTI-CP stream may be transmitted from this SDTI-CP interface 202A to the transmission line 203.

Here, as described above, bits b7 to b5 of "Content Package Type" of the system item (see FIG. 6) may be assigned to "Stream Status" flag which may be used to discriminate the position of the picture unit. The 3-bit "Stream Status" flag provided within each picture unit within the SDTI-CP stream outputted from the SDTI-CP interface 202A may be set in correspondence with the editing interval.

FIG. 14 shows an example of the manner in which flags are set. In a pre-roll interval SPR, a flag of each picture unit may be set to "1". In an editing interval SED, a flag of the first picture unit may be set to "2", a flag of the last picture unit may be set to "4", and a flag of the intermediate picture unit may be set to "3". Also, in a post-roll interval SPO, a flag of each picture unit may be set to "5".

FIG. 15 shows another example of the manner in which flags are set. Although the manner in which the flags are set in the pre-roll interval SPR and in the post-roll interval SPO is the same as that of the example shown in FIG. 14, since there is only one picture unit within the editing interval SED, the flag of this picture unit may be set to "6".

In the transmission system shown in FIG. 13, the SDTI-CP stream outputted from the reproducing-side SDTI-CP interface 202A may be supplied through the transmission line 203 to the recording-side SDTI-CP interface 202B. This SDTI-CP interface 202B may receive the SDTI-CP stream, may extract each contents package from the payload portion of the transmission packet of each video frame and may sequentially supply this contents package or video data, audio data, metadata or the like contained in that contents package to the VTR 201B.

Then, the VTR 201B may determine on the basis of the setting of the above-mentioned 3-bit "Stream Status" whether or not the current picture unit belongs to the pre-roll interval SPR, whether or not the current picture unit belongs to the editing interval SED and whether or not the current picture unit belongs to the post-roll interval SPO, thereby controlling the recording. That is, as shown in FIG. 16, when the stream from the VTR (A) "VTR 201A" side enters the pre-roll interval SPR, "VTR 201B" may start the operation of the tape driving system or the like, and may achieve the synchronization of the servo or the like. Then, when the stream from the VTR (A) side enters the editing pre-roll interval SPR, the VTR (B) may start the recording. Further, when the stream from the VTR (A) side ends the editing interval SED and enters the post-roll interval SPO, the VTR (B) may stop the operation of the tape driving system or the like, whereby the VTR editing can be carried out satisfactorily.

While the picture unit is used as the frame unit in the above-mentioned embodiment, the picture unit is limited thereto, and this invention can be similarly applied to the case in which the picture unit may be the field unit or other units.

As set forth above, according to this invention, the extension data having the stream information at the picture unit of the video data and the main data comprising the video data and/or audio data may be extracted from the received transmission packet, and the recording of the main data may be controlled on the basis of the stream information. The operation of the tape driving system or the like of the VTR may be started during the pre-roll interval, the synchronization of the servo or the like may be achieved, the recording of the main data may be executed during the editing interval, and the operation of the tape driving system or the like of the VTR may be stopped during the following post-roll interval. Therefore, according to this invention, it is possible to satisfactorily execute the VTR editing.

Industrial Applicability

As described above, the data transmission method and apparatus and the data reception method and apparatus according to this invention are for use with a television conference system, a visual telephone system, a broadcasting device or the like for transmitting a moving picture signal and an audio signal or the like from the transmission side to the reception side through the transmission line.

What is claimed is:

1. In a data transmission method of transmitting a transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which main data comprising video data and/or audio data is inserted, said data transmission method comprising the steps of:

a first step of inserting first data containing extension data having stream information indicating whether or not a picture unit belongs to a pre-roll interval located ahead of an editing interval, whether or not a picture unit belongs to an editing interval and whether or not a picture unit belongs to a post-roll interval located behind an editing interval and second data containing said main data into said payload area at said picture unit of video data; and a second step of transmitting said transmission packet in which said first data and said second data were inserted into said payload area at said first step in the form of serial data.

2. A data transmission method as claimed in claim 1, wherein said stream information indicating that said picture unit belongs to the editing interval indicates whether or not said picture unit is the first picture unit of said editing interval, whether or not said picture unit is the intermediate picture unit of said editing interval, whether or not said picture unit is the last picture unit of said editing interval and whether or not said picture unit is the first and last picture units of said editing interval.

3. In a data reception method of receiving a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which first data containing main data comprising video data and/or audio data and second data containing extension data having stream information indicating whether or not a picture unit belongs to a pre-roll interval located ahead of an editing interval, whether or not a picture unit belongs to an editing interval and whether or not a picture unit belongs to a post-roll interval located behind an editing interval are inserted at the said picture unit of video data, said data reception method comprising the steps of:

a first step of receiving said transmission packet;

a second step of extracting said main data and said extension data from said transmission packet received at said first step; and a third step of controlling recording of said main data extracted at said second step on the basis of said stream information within said extension data extracted at said second step.

4. A data reception method as claimed in claim 3, wherein said stream information indicating that said picture unit belongs to an editing interval indicates whether or not said picture unit is the first picture unit of said editing interval, whether or not said picture unit is the intermediate picture unit of said editing interval, whether or not said picture unit is the last picture unit of said editing interval and whether or not said picture unit is the first and last picture units of said editing interval.

5. In a data transmission apparatus for transmitting a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which main data comprising video data and/or audio data is inserted, said data transmission apparatus comprising:

means for inserting first data containing extension data having stream information indicating whether or not a picture unit belongs to a pre-roll interval located ahead of an editing interval, whether or not a picture unit belongs to an editing interval and whether or not a picture unit belongs to a post-roll interval located behind an editing interval and second data containing said main data into said payload area at said picture unit of video data; and means for transmitting said transmission packet in which said first data and said second data are inserted into said payload area in the form of serial data.

6. A data transmission apparatus as claimed in claim 5, wherein said stream information indicating that said picture unit belongs to an editing interval indicates whether or not said picture unit is the first picture unit of said editing interval, whether or not said picture unit is the intermediate picture unit of said editing interval, whether or not said picture unit is the last picture unit of said editing interval and whether or not said picture unit is the first and last picture units of said editing interval.

7. In a data reception apparatus for receiving a serial digital transfer interface transmission packet in which an interval of each line of a video frame comprises an end synchronizing code area into which an end synchronizing code is inserted, an ancillary data area into which ancillary data is inserted, a start synchronizing code area into which a start synchronizing code is inserted and a payload area into which first data containing main data comprising video data and/or audio data and second data containing extension data having stream information indicative of whether a picture unit belongs to a pre-roll interval located ahead of an editing interval, whether or not a picture unit belongs to an editing interval and whether or not a picture unit belongs to a post-roll interval located behind an editing interval are inserted at said picture unit of video data, said data reception apparatus comprising:

means for receiving said transmission packet;

means for extracting said main data and said extension data from said received transmission packet; and means for controlling recording of said main data extracted from said transmission packet on the basis of said stream information within said extension data extracted from said transmission packet.

8. A data reception apparatus as claimed in claim 7, wherein said stream information indicating that said picture unit belongs to the editing interval indicates whether or not said picture unit is the first picture unit of said editing interval, whether or not said picture unit is the intermediate picture unit of said editing interval, whether or not said picture unit is the last picture unit of said editing interval and whether or not said picture unit is the first and last picture units of said editing interval.

* * * * *